United States Patent [19]

Makabe et al.

[11] Patent Number: 4,951,165

[45] Date of Patent: Aug. 21, 1990

[54] MAGNETIC HEAD HAVING IMPROVED HIGH DENSITY RECORDING AND/OR REPRODUCTION CHARACTERISTICS

[75] Inventors: Jun Makabe; Hedeharu Kurata, Higashimurayama; Hiroshi Matsunaga, Kunitachi, all of Japan

[73] Assignee: Teac Corporation, Japan

[21] Appl. No.: 295,301

[22] Filed: Jan. 10, 1989

[30] Foreign Application Priority Data

Jan. 13, 1988 [JP] Japan .................................. 63-5385

[51] Int. Cl.⁵ .......................... G11B 5/48; G11B 5/60; G11B 21/21; G11B 21/16
[52] U.S. Cl. .................................................. 360/104
[58] Field of Search ................................ 360/103, 104

[56] References Cited

U.S. PATENT DOCUMENTS 4,613,920 9/1986 Higuchi et al. ...................... 360/121
4,814,920 3/1989 Yamano et al. ...................... 360/104

FOREIGN PATENT DOCUMENTS 62-67315 4/1987 Japan .

*Primary Examiner*—Robert S. Tupper
*Attorney, Agent, or Firm*—Andrus, Sceales, Starke & Sawall

[57] ABSTRACT

A magnetic head carries out at least one of a recording, reproduction and erasure of an information on and/or from a magnetic recording medium by making sliding contact with the magnetic recording medium. The magnetic head comprises a first slider having a first surface which confronts the magnetic recording medium, a second slider having a second surface which confronts the magnetic recording medium and a contact portion for making sliding contact with the recording medium, and a magnetic head part sandwiched between the first and second sliders for carrying out at least one of the recording, reproduction and erasure of the information on and/or from the recording medium. The magnetic head part has a sliding contact surface for making sliding contact with the magnetic recording medium, and this magnetic head part projects from the first and second surfaces of the first and second sliders so that the sliding contact surface approximately coincides with the contact surface of the second slider.

12 Claims, 4 Drawing Sheets

FIG. 5
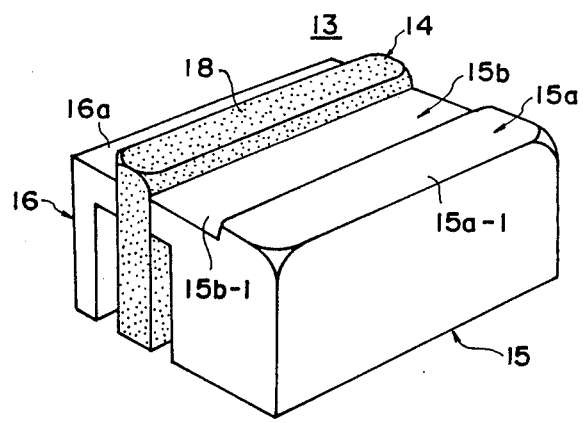
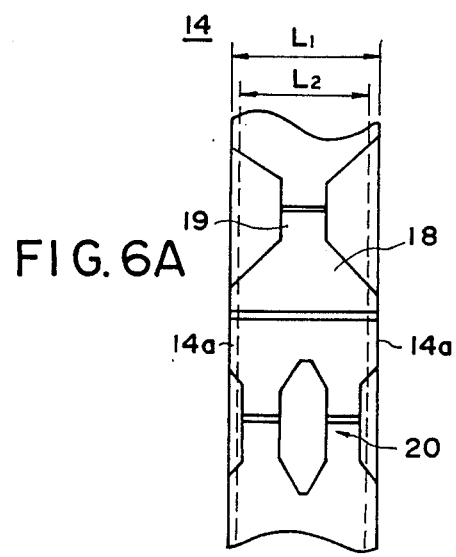
FIG. 6A
FIG. 6B
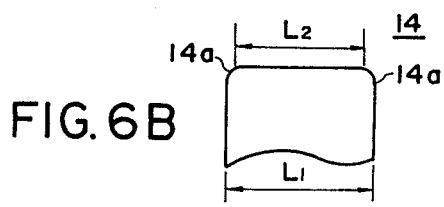

MAGNETIC HEAD HAVING IMPROVED HIGH DENSITY RECORDING AND/OR REPRODUCTION CHARACTERISTICS

BACKGROUND OF THE INVENTION

The present invention generally relates to magnetic heads, and more particularly to a magnetic head employed in a magnetic disc recording and/or reproducing apparatus such as a floppy disc drive.

For example, a magnetic head 1 having a construction shown in FIG. 1 and a magnetic head 2 having a construction shown in FIG. 2 are generally known magnetic heads which are employed in a magnetic disc recording and/or reproducing apparatus (hereinafter simply referred to as a magnetic disc apparatus).

The magnetic head 1 has sliders 3 and 4 made of a ceramic material and a magnetic head part 5 having a ferrite core. The magnetic head part 5 is indicated with a dot pattern and the illustration of a gap is omitted. The magnetic head part 5 is sandwiched between the sliders 3 and 4 and adhered together by an adhesive agent. In addition, a sliding contact surface 6 which makes sliding contact with a magnetic disc is formed by lapping a surface of the adhered structure to a mirror surface, and corner portions of the adhered structure are chamfered.

On the other hand, the magnetic head 2 has a magnetic head part 7 and a slider 8 which is located on only one side of the magnetic head part 7.

The magnetic heads 1 and 2 are respectively mounted on a head carriage (not shown) through a gimbal spring 9 as shown in FIGS. 3 and 2. FIG. 3 shows the magnetic head 1 in use, where two identical magnetic heads 1 confront each other through a magnetic disc 10 so that the magnetic heads 1 can record and/or reproduce information on respective sides of the magnetic disc 10 by making sliding contact with the respective sides. FIG. 2 shows the magnetic head 2 in use, where two identical magnetic heads 2 similarly confront each other through the magnetic disc 10. In FIG. 2, one magnetic head 2 and the magnetic disc are shown in phantom lines. As shown in FIGS. 3 and 2, the magnetic heads 1 and 2 respectively have a back bar 11 and a coil 12 coupled to the respective magnetic head parts 5 and 7.

But the magnetic head 1 suffers a problem in that satisfactory recording and reproducing characteristics cannot be obtained especially when a high density recording and reproduction are carried out, and an explanation will be given hereunder of this problem.

That is, the adhesive agent used to adhere the sliders 3 and 4 and the magnetic head part 5 of the magnetic head 1 is an epoxy adhesive agent in most cases. The epoxy adhesive agent is generally used because it is inexpensive and its thermosetting adherence occurs at a relatively low temperature. For this reason, it is not only possible to reduce the production cost but also reduce the undesirable effects caused by the difference between the thermal expansions of the magnetic head part 5 and the sliders 3 and 4. In addition, it has been considered in the past that the magnetic head 1 is satisfactory for use in the conventional magnetic recording and reproduction process in which the recording density is not extremely high.

However, the present inventors have found that a step d actually exists between the magnetic head part 5 and the sliders 3 and 4 as shown in FIG. 4. This fact was confirmed by measuring the smoothness of the sliding contact surface 6 of the magnetic head 1 with a high magnification by use of a measuring instrument such as TALYSURF 6 manufactured by Rank Taylor Hobson Ltd. of England and SURFCOM 900A manufactured by Tokyo Seimitsu of Japan. It is regarded that this step d is generated during a thermal process which is carried out in an adhesion step of the production process, during a processing step using a working solution carried out after the adhesion step, and due to an environment (for example, high humidity and temperature conditions of summer) in the process of forwarding and transporting the produced magnetic head 1. Further, it is regarded that this step d is also generated due to a difference in lapped quantities of the magnetic head part 5 and the sliders 3 and 4 caused by the different materials used therefor during a lapping process in which the sliding contact surface 6 is formed to the mirror surface.

A relation between the step d and the characteristics of the magnetic head 1 will now be considered. The magnetic head 1 is separated from the magnetic disc 10 by the existence of the step d, and a separation loss Ls can be described by the following formula, where d1 denotes a depth (micron) of the step d and W1 denotes a recording wavelength (micron).

$$Ls = 54.6 \times (d1/W1) \ (dB)$$

It may be seen from the above formula that the separation loss Ls increases as the depth d1 increases and also as the recording wavelength W1 decreases, that is, as the recording density increases. The following Table shows the relation between the step d and the characteristics of the magnetic head 1 obtained by the present inventors for a case where d1=0.1 (micron).

TABLE

| Recording Density (Bit Per Inch) | Recording Wavelength (Micron) | Separation Loss (dB) |
|---|---|---|
| 8717 | 5.83 | 0.94 |
| 34868 | 1.46 | 3.74 |

As shown in the above Table, the separation loss is 0.94 (dB) and low when the recording density is 8718 (BPI) which is relatively low and the recording wavelength is 5.83 (microns) which is relatively large. Accordingly, there is virtually no undesirable effect on the magnetic recording and reproducing characteristics even when the magnetic head 1 has the step d of d1 =0.3 (micron).

However, when the recording density is 34868 (BPI) and the recording wavelength is 1.46 (microns) to carry out the high density recording (short wavelength recording), the separation loss becomes 3.74 (dB). Hence, although d1=0.2 (micron), the effect of the step d is large in this case and it is impossible to obtain satisfactory magnetic recording and reproducing characteristics.

In other words, the diameter of the magnetic disc has become smaller in recent years from the 8-inch disc, the 5-inch disc to the 3.5-inch disc, and the maximum recording frequency is inevitably reduced in order to achieve the high density recording with the given size of magnetic disc. For this reason, as the size of the magnetic disc is further reduced, the step d which conventionally did not cause any problems becomes the source of the deteriorated magnetic recording and reproducing characteristics.

On the other hand, the magnetic head 2 has a poor stability with respect to the gimbal spring 9 and the recording and reproducing characteristics are deteriorated thereby. Furthermore, the magnetic head 2 cannot be assembled with a high efficiency as will be described hereunder.

As shown in FIG. 2, the magnetic head 2 is mounted on the gimbal spring 9 by adhering the slider 8 on the gimbal spring 9 by an adhesive agent A indicated by a hatching. But according to this structure, the lower magnetic head 2 receives a clockwise moment of force as indicated by an arrow M and undergoes a rotary displacement when a load force P is applied in a direction of the arrow. The magnetic head part 7 can no longer make sliding contact with the magnetic disc 10 when this rotary displacement of the magnetic head 2 occurs, and the magnetic head 2 cannot accurately trace an intended track of the magnetic disc 10. In an extreme case, the magnetic head 2 separates from the magnetic disc 10 and there is a problem in that satisfactory recording and reproduction cannot be carried out. The upper magnetic head 2 suffers the same deficiencies as the lower magnetic head 2.

In addition, when mounting the lower magnetic head 2 on the gimbal spring 9, for example, the magnetic head 2 does not sit still in an upright position and rolls to the right in FIG. 2 due to the structure of the magnetic head 2. Therefore, the magnetic head 2 must be secured in position by use of an instrument or the like until the adhesive agent A sets or hardens, and the assembling of the magnetic head 2 cannot be carried out with a high efficiency.

SUMMARY OF THE INVENTION

Accordingly, it is a general object of the present invention to provide a novel and useful magnetic head in which the problems described above are eliminated.

Another and more specific object of the present invention is to provide a magnetic head for carrying out at least one of a recording, reproduction and erasure of an information on and/or from a magnetic recording medium by making sliding contact with the magnetic recording medium, comprising a first slider having a first surface which confronts the magnetic recording medium, a second slider having a second surface which confronts the magnetic recording medium and a contact portion for making sliding contact with the recording medium, and a magnetic head part sandwiched between the first and second sliders for carrying out at least one of the recording, reproduction and erasure of the information on and/or from the recording medium. The magnetic head part has a sliding contact surface for making sliding contact with the magnetic recording medium, and this magnetic head part projects from the first and second surfaces of the first and second sliders so that the sliding contact surface approximately coincides with the contact surface of the second slider. According to the magnetic head of the present invention, it is possible to guarantee satisfactory recording and reproducing characteristics by maintaining a satisfactory sliding contact between the sliding contact surface and the magnetic recording medium and preventing the separation loss. In addition, it is possible to make an area of the sliding contact surface small. For this reason, it is possible to increase a contact pressure per unit area and make the magnetic head especially suited for the high density recording (that is, short wavelength recording).

Still another object of the present invention is to provide the magnetic head of the above described type wherein the magnetic head part is adhered on the first and second sliders by an adhesive agent. According to the magnetic head of the present invention, it is possible to ensure a satisfactory sliding contact between the sliding contact surface of the magnetic head part and the magnetic recording medium regardless of the effects caused by the adhesive agent such as a displacement of the magnetic head part with respect to the first and second sliders.

Other objects and further features of the present invention will be apparent from the following detailed description when read in conjunction with the accompanying drawings.

BRIEF DESCRIPTION OF THE DRAWINGS

FIG. 3 a side view showing the conventional magnetic head shown in. FIG. 1 in use;

FIG. 5 is a perspective view showing an embodiment of a magnetic head according to the present invention;

FIGS. 6A and 6B respectively are a top view and a side view of an essential part of a magnetic head part of the magnetic head in FIG. 5;

DETAILED DESCRIPTION

Figure 1:
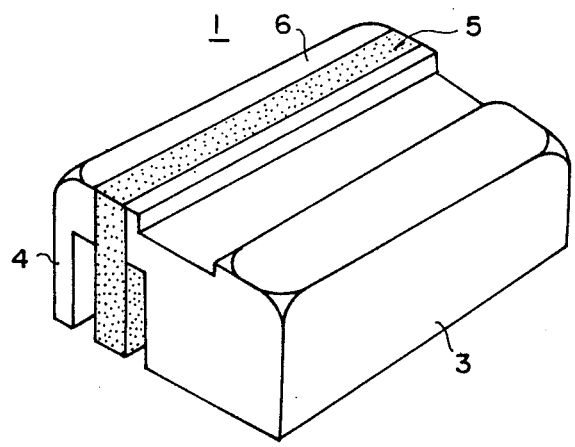
FIG. 1 is a perspective view showing an example of a conventional magnetic head.
Figure 2:
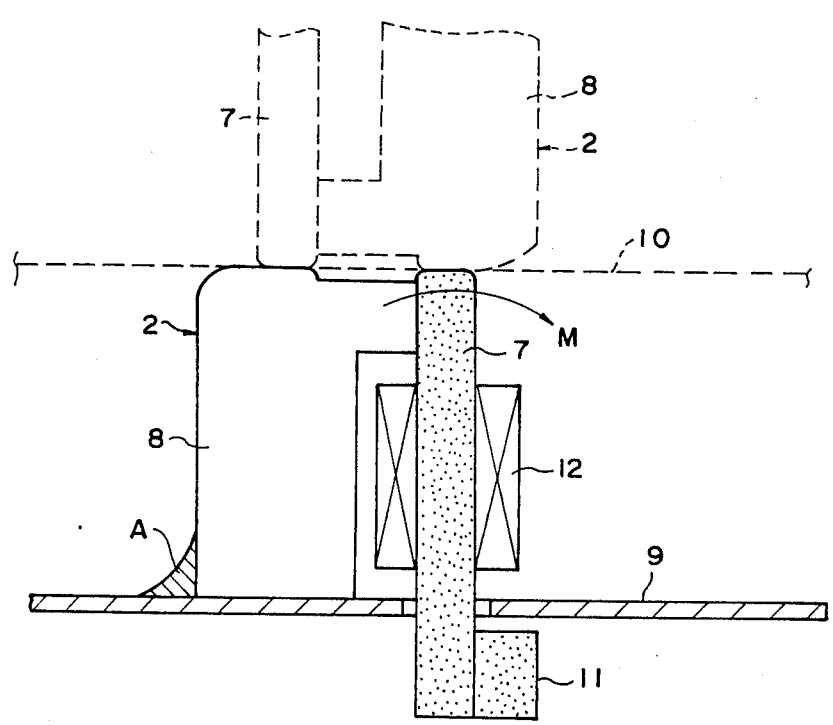
FIG. 2 is a side perspective view showing another example of the conventional head in use.
Figure 3:
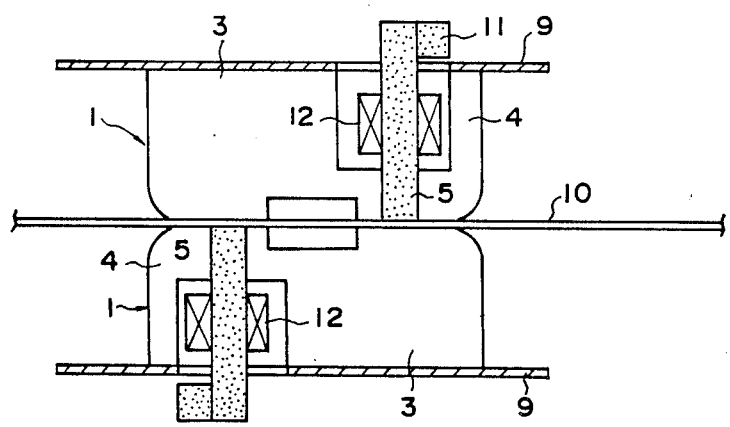
Figure 4:
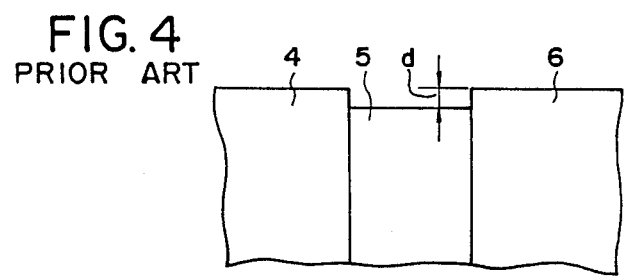
FIG. 4 is a side view showing an essential part of the magnetic head shown in FIGS. 1 and 3 for explaining a step formed between a magnetic head part and sliders of the magnetic head.

A description will be given of an embodiment of a magnetic head according to the present invention, by referring to FIG. 5. In FIG. 5, a magnetic head 13 has a pair of sliders 15 and 16 and a magnetic head part 14. The magnetic head part 14 is indicated with a dot pattern and the illustration of a gap is omitted. The magnetic head part 14 is sandwiched between the sliders 15 and 16.

For example, the magnetic head part 14 is a bulk type tunnel erase head made of ferrite. FIGS. 6A and 6B respectively are a top view and a side view of an essential part of the magnetic head part 14 for explaining a width of the magnetic head part 14 and a track width of tracks formed on a magnetic disc (not shown). As shown in FIGS. 6A and 6B, a width L1 of the magnetic head part 14 is greater than a track width L2 of the tracks. A curved (chamfered) surface 14a is formed by a chamfering process at an outer peripheral edge portion of a flat surface of the magnetic head part 14 corresponding to a difference (L1-L2) between the widths L1 and L2. The flat surface of the magnetic head part 14 which excludes the curved surface 14a and has a width equal to the track width L2 is referred hereunder as a sliding contact surface 18 which makes sliding contact with a magnetic disc 17 which will be described later in the specification. In FIG. 6A, the magnetic head part 14 has a read/write head portion 19 and an erase head portion 20. Hence, the magnetic head 13 can carry out at least one of a recording, reproduction and erasure of an information on and/or from the magnetic disc 17.

The sliders 15 and 16 are both made of a ceramic material, for example, and these sliders 15 and 16 are adhered on respective sides of the magnetic head part 14 by an epoxy adhesive agent which is conventionally used. A dummy head portion 15a which functions as the so-called dummy head is formed on the slider 15, and top surface 15a-1 of the dummy head portion 15a approximately coincides with the sliding contact surface 15a of the magnetic head part 14. Outer peripheral edge portions of the top surface 15a-1 of the dummy head portion 15a are chamfered. In addition, a depression 15b is formed in a portion of the dummy head portion 15a closer to the magnetic head part 14. On the other hand, a top surface 16a of the slider 16 approximately coincides with a top surface 15b-1 of the depression 15. Of course, the top surfaces 15a-1, 15b-1 and 16a confront the magnetic disc 17 when the magnetic head 13 is in use.

According to the structure of this magnetic head 13, the magnetic head part 14 projects from the top surfaces 15b-1 and 16a of the respective sliders 15 and 16, and a step is formed between the magnetic head part 14 and the sliders 15 and 16.

Figure 7:
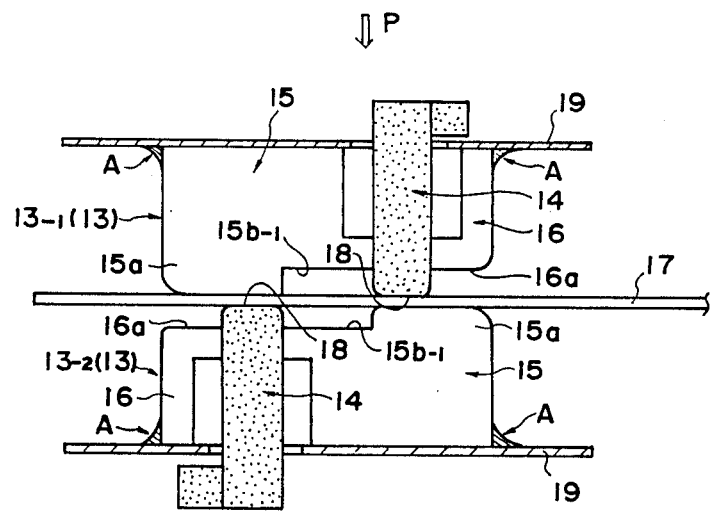
FIG. 7 is a side view showing the magnetic head shown in FIG. 5 in use.

Two magnetic heads 13 are used when a magnetic disc apparatus (not shown) is to simultaneously record and/or reproduce information on and/or from both sides of the magnetic disc 17. In other words, the two magnetic heads 13 are mounted on respective gimbal springs 19 and arranged symmetrically to confront each other through the magnetic disc 17 as shown in FIG. 7. Hereunder, an upper magnetic head 13 will also be referred to as an upper head 13-1 and a lower magnetic head 13 will also be referred to as a lower head 13-2. Each magnetic head 13 is adhered on the gimbal spring 19 by an adhesive agent A at both sides of the sliders 15 and 16 as shown. For this reason, even when a load force P applied on the upper head 13-1 in a direction of an arrow is applied to the lower head 13-2, the magnetic head part 14 of both the upper and lower heads 13-1 and 13-2 will not undergo a rotary displacement because the sliders 15 and 16 on both sides of the magnetic head part 14 are adhered on the gimbal spring 19 in both the upper and lower heads 13-1 and 13-2. Furthermore, the sliding contact surface 18 of the magnetic head part 14 will not separate from the magnetic disc 17 for each of the upper and lower heads 13-1 and 13-2. As a result, it is possible to prevent a tracking error of the magnetic head 13 and obtain satisfactory recording and reproducing characteristics.

When mounting the magnetic head 13 on the gimbal spring 19, the magnetic head 13 sits still in an upright position since the sliders 15 and 16 on both sides of the magnetic head part 14 are adhered on the gimbal spring 19. Thus, there is no need to secure the magnetic head 13 in position by use of an instrument or the like until the adhesive agent A sets or hardens, and the assembling of the magnetic head 13 can be carried out with a high efficiency.

Next, a description will be given of a state of sliding contact between the sliding contact surface 18 of the magnetic head part 14 and the magnetic disc 17. As described above, the magnetic head part 14 projects from the top surfaces 15b-1 and 16a of the sliders 15 and 16. Hence, only the sliding contact surface 18 makes sliding contact with the magnetic disc 17 in a vicinity of the magnetic head part 14. The sliding contact surface 18 of the magnetic head part 14 remains above the top surfaces 15b-1 and 16a of the sliders 15 and 16, even when the magnetic head part 14 undergoes a displacement with respect to the sliders 15 and 16 due to the adhesive agent A adhering the magnetic head part 14 and the sliders 15 and 16 depending on the production process and the environment of the magnetic head 13. In other words, the magnetic head part 14 can constantly be maintained in sliding contact with the magnetic disc 17 regardless of the displacement of the magnetic head part 14. A projecting quantity of the magnetic head part 14 from the top surfaces 15b-1 and 16a of the sliders 15 and 16 is set slightly greater than an anticipated displacement quantity of the magnetic head part 14 caused by the adhesive agent A.

Figure 8:
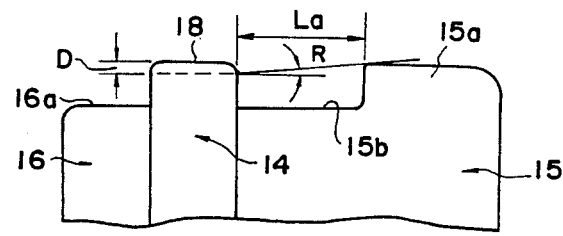
FIG. 8 is a side view showing an essential part of the magnetic head shown in FIG. 5 for explaining a state of sliding contact between a magnetic head part and a magnetic disc.

On the other hand, when the magnetic head part 14 undergoes a displacement due to the adhesive agent A and the sliding contact surface 18 moves to a position indicated by a phantom line in FIG. 8, it is necessary to guarantee the sliding contact of the sliding contact surface 18 on the magnetic disc 17 relative to the dummy head portion 15a. When an imaginary line connecting the dummy head portion 15a and the sliding contact surface 18 forms an angle R (min) to a horizontal line La, this angle R can be described by the following formula, where D denotes a displacement quantity (micron) of the magnetic head part 14 and La denotes a width (m) of the depression 15b. For example, D=0.2 (micron) and La =0.95 (mm).

$$
\begin{aligned}
R &= \tan^{-1}(D/La) \\
&= \tan^{-1}[0.2/(0.95 \times 10^{-3})] \\
&= 0.72 \text{ (min)}
\end{aligned}
$$

It may be seen from the above formula that the angle R is negligibly small. In addition, the magnetic disc 17 is in many cases flexible, such as the case of the so-called floppy disc. For this reason, it is possible to maintain a satisfactory sliding contact between the sliding contact surface 18 of the magnetic head part 14 and the magnetic disc 17. Even when the high density recording (short wavelength recording) is carried out by use of the magnetic head 13, the generation of the separation loss can be prevented and the recording and reproducing characteristics can be improved considerably since the magnetic head part 14 and the magnetic disc 17 will not separate and an appropriate sliding contact is maintained between the sliding contact surface 18 of the magnetic head part 14 and the magnetic disc 17.

Figure 9:
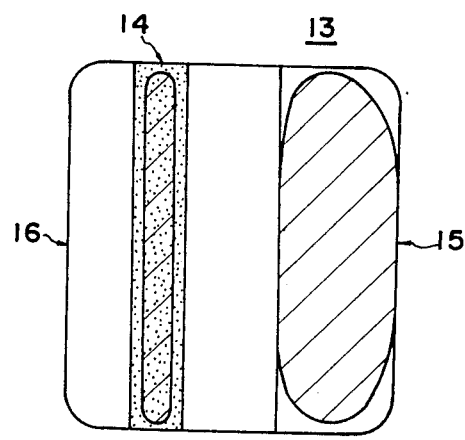
FIG. 9 is a top view showing an essential part of the magnetic head shown in FIG. 5 for explaining an area of sliding contact between the magnetic head part and the magnetic disc.

Next, a description will be given of an area of sliding contact between the magnetic head part 14 and the magnetic disc 17, by referring to FIG. 9. FIG. 9 shows a top view of an essential part of the magnetic head 13, that is, a portion of the magnetic head 13 which confronts the magnetic disc 17. Furthermore, the portions of the magnetic head 13 which make the sliding contact with the magnetic disc 17 are indicated by hatchings. The area of contact at the magnetic headpart 14 is small compared to the area of contact at the dummy head portion 15a.

In a vicinity of the magnetic head part 14, only the sliding contact surface 18 of the magnetic head 13 makes sliding contact with the magnetic disc 17, and the area of sliding contact at the magnetic head part 14 is small. As is well known, in order to achieve a satisfactory sliding contact between the magnetic head and the magnetic disc for the high density recording, it is necessary to obtain a large contact pressure C per unit area by setting a contact area S to a small value for a predetermined load force P, where $C=P/S$. In the case of the magnetic head 13, it may be seen that the contact pressure C per unit area at the magnetic head part 14 can be set to a large value, and it is thus possible to realize a satisfactory state of sliding contact between the magnetic head 13 and the magnetic disc 17 for the high density recording.

Figure 10:
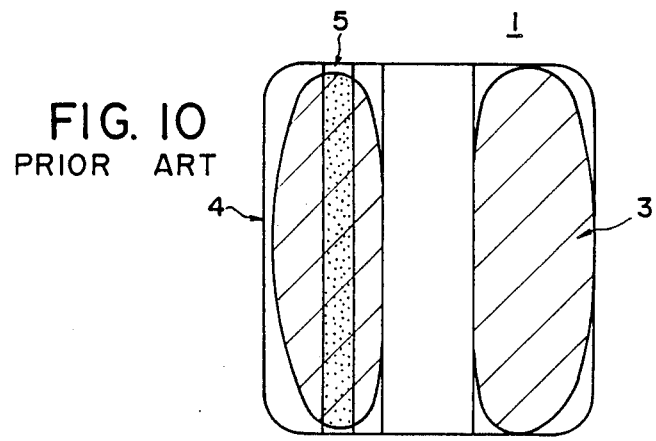
FIG. 10 is a top view showing an essential part of the conventional magnetic head shown in FIG. 1 for explaining an area of sliding contact between the magnetic head part and the magnetic disc.

For the sake of comparison, FIG. 10 shows a top view of an essential part of the conventional magnetic head 1 shown in FIG. 1, that is, a portion of the magnetic head 1 which confronts the magnetic disc 10. The portions of the magnetic head 1 which make the sliding contact with the magnetic disc 10 are indicated by hatchings, similarly to FIG. 9. As may be seen from FIG. 10, the contact area indicated by the hatching is large compared to that shown in FIG. 9, and the contact pressure C per unit area is small thereby making the conventional magnetic head 1 unsuited for the high density recording.

In addition, although the magnetic head part 14 projects from the top surfaces 15b-1 and 16a of the sliders 15 and 16, the curved surface 14a is formed at each peripheral edge portion of the magnetic head part 14. This curved surface 14a also helps the satisfactory sliding contact between the sliding contact surface 18 and the magnetic disc 17. Moreover, by the provision of the curved surface 14a, the width L1 of the magnetic head part 14 becomes wider than the track width L2 as shown in FIGS. 6A and 6B, thereby making the mechanical strength of the magnetic head part 14 large. Hence, no problem will be generated in respect to the durability or serviceable life of the magnetic head 13.

Further, the present invention is not limited to these embodiments, but various variations and modifications may be made without departing from the scope of the present invention.

What is claimed is:

1. A magnetic head for carrying out at least one of a recording, reproduction and erasure of an information on and/or from a magnetic recording medium by making sliding contact tithe the magnetic recording medium, said magnetic head comprising:

a first slider having a first surface which confronts the magnetic recording medium;

a second slider having a second surface which confronts the magnetic recording medium and a contact portion for making sliding contact with the magnetic recording medium; and a magnetic head part sandwiched between said first and second sliders for carrying out at lest one of the recording, reproduction and erasure of the information on and/or from the magnetic recording medium, said magnetic head part having a sliding contact surface for making sliding contact with the magnetic recording medium, said magnetic head part projecting from the first and second surfaces of said first and second sliders so that said sliding contact surface approximately coincides with the contact surface of said second slider, said first and second surfaces of said first and second sliders being located on both sides of said magnetic head part, said sliding contact surface of said magnetic head part making sliding contact with the magnetic recording medium in a vicinity of said magnetic head part, said second surface of said second slider being located between said magnetic head part and the contact portion of said second slider, only the contact portion of said second slider and the sliding contact surface of said magnet head part making contact with the magnetic recording medium.

2. The magnetic head as claimed in claim 1 wherein said first and second surfaces of said first and second sliders are approximately parallel to the magnetic recording medium which makes contact with the contact portion of said second slider and the sliding contact surface of said magnetic head part.

3. The magnetic head as claimed in claim 2, wherein said first and second surfaces of said first and second sliders approximately coincide.

4. The magnetic head as claimed in claim 1 wherein said magnetic head part is adhered on said first and second sliders by an adhesive agent.

5. The magnetic head as claimed in claim 1 wherein said magnetic head part has chamfered portions at peripheral edge portions of said sliding contact surface.

6. The magnetic head as claimed in claim 1 wherein said second slider has chamfered portions at peripheral edge portions of the contact surface of said second slider.

7. The magnetic head as claimed in claim 1 wherein said magnetic head part has a first width at said sliding contact surface, said first width being greater than a second width of a track formed on the magnetic recording medium.

8. The magnetic head as claimed in claim 7 wherein said magnetic head part has chamfered portions at peripheral edge portions of said sliding contact surface, a portion of said sliding contact surface excluding the chamfered portions having said second width.

9. The magnetic head as claimed in claim 8 wherein said second slider has chamfered portions at peripheral edge portions of the contact surface of said second slider.

10. The magnetic head as claimed in claim 8 wherein said magnetic head part is adhered on said first and second sliders by an adhesive agent.

11. The magnetic head as claimed in claim 10 wherein said adhesive agent is an epoxy adhesive agent.

12. The magnetic head as claimed in claim 1 wherein a first area of contact between the magnetic recording medium and said sliding contact surface of said magnetic head part is smaller than a second area of contact between the magnetic recording medium and the contact portion of said second slider.

* * * * *